United States Patent [19]

Tucker et al.

[11] Patent Number: 5,733,679
[45] Date of Patent: Mar. 31, 1998

[54] BATTERY SYSTEM AND A METHOD FOR GENERATING ELECTRICAL POWER

[75] Inventors: Steven P. Tucker, Portsmouth; Raymond W. Roberts, Esmond; Eric G. Dow, Barrington; James R. Moden, Bristol, all of R.I.

[73] Assignee: The United States of America as represented by the Secretary of the Navy, Washington, D.C.

[21] Appl. No.: 797,765

[22] Filed: Jan. 8, 1997

[51] Int. Cl.$^6$ .................. H01M 6/32; H01M 2/38
[52] U.S. Cl. .................. 429/51; 429/62; 429/118; 429/206
[58] Field of Search .................. 429/50–52, 62, 429/70, 72, 80, 118, 119, 120, 206

[56] References Cited

U.S. PATENT DOCUMENTS

| | | | |
|---|---|---|---|
| 4,435,487 | 3/1984 | Supelak et al. | 429/70 |
| 5,399,444 | 3/1995 | Smith | 429/70 |

*Primary Examiner*—Anthony Skapars
*Attorney, Agent, or Firm*—Michael J. McGowan; Michael F. Oglo; Prithvi C. Lall

[57] ABSTRACT

The present invention relates to a dry composition of materials to be used in a battery system. The dry composition comprises a mixture consisting of sodium hydroxide and sodium oxide. In a first reservoir in the battery system, the mixture is present in an amount sufficient to form with water a heated sodium hydroxide electrolyte solution having a 15% by weight concentration of sodium hydroxide. In a second reservoir in the battery system, the mixture is present in an amount sufficient to form with water a heated sodium hydroxide electrolyte solution having to up to about 75% by weight concentration of sodium hydroxide. The present invention also relates to a battery system and a method for generating electrical power which utilize the aforementioned dry composition of materials.

18 Claims, 3 Drawing Sheets

BATTERY SYSTEM AND A METHOD FOR GENERATING ELECTRICAL POWER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to improved compositions for use in battery systems and to a battery system and a method for generating electrical power using said compositions. The improved compositions comprise a dry mixture of sodium hydroxide and sodium oxide which when activated by water form heated electrolyte solutions.

(2) Prior Art

Battery cells having liquid electrolytes are known in the art. U.S. Pat. Nos. 3,440,099 to Okinaka and U.S. Pat. No. 5,215,836 to Eisenberg illustrate two such systems. The Okinaka patent relates to the improvement of the charging characteristics of nickel-cadmium cells by the addition of an additive selected from the group consisting of sodium borate, potassium borate, sodium phosphate, potassium phosphate and mixtures thereof to an aqueous electrolyte solution. Okinaka employs the electrolyte solution with the addition to achieve rechargeable, i.e. secondary battery, results. Okinaka does not concern primary batteries and/or circulating electrolytes.

The Eisenberg patent relates to a battery having a zinc or zinc alloy anode, a metal oxide or hydroxide cathode and an alkaline electrolyte comprising a solution of a salt formed by the reaction of boric acid, phosphoric acid or arsenic acid with am alkali or earth alkali hydroxide present in a sufficient amount to produce a stoichiometric excess of hydroxide to acid in the range of 2.5 to 11.0 equivalents per liter, and of a soluble alkali or earth or earth alkali fluoride in an amount corresponding to a concentration range of 0.01 to 1.0 equivalents per liter of total solution. Eisenberg reacts an acid and a base, which could not be stored together, to produce a new neutral salt electrolyte. Eisenberg is not directed to a primary battery and/or circulating electrolytes.

FIG. 1 illustrates a prior art aluminum-silver oxide battery system 10. Such a battery system has been proposed and developed to power an assortment of underwater vehicles. In this system, the stored dry battery is activated by the introduction of an electrolyte solution of alkali metal hydroxide, i.e., sodium hydroxide, dissolved in sea water or fresh water. A majority of the presently considered applications will use sea water. The battery system 10 produces electrical energy with the introduction of the electrolyte, while undergoing the following electrochemical reaction:

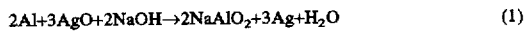

$$2Al + 3AgO + 2NaOH \rightarrow 2NaAlO_2 + 3Ag + H_2O \quad (1)$$

It is believed that to a lesser degree, a corrosion reaction also takes place. The following is the corrosion reaction which is believed to take place:

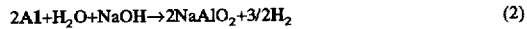

$$2Al + H_2O + NaOH \rightarrow 2NaAlO_2 + 3/2 H_2 \quad (2)$$

During storage, the entire system 10 is in a dry state under an atmosphere of an inert gas such as dry nitrogen or dry argon. Referring now to FIG. 1, the system 10 includes a battery cartridge 12 which typically consists of a number of bipolar assemblies of aluminum anodes and silver peroxide cathodes separated by a suitable thin metal foil, i.e. foil made from copper, nickel or silver. The bipolar assemblies are arranged under axial compression in a pile configuration in which the anode of one bipolar assembly and the cathode of an adjacent bipolar assembly form and constitute an electrochemical cell. The number of such assemblies in a given battery design is determined by the voltage requirement placed on the battery. Thus, the battery cartridge 12 is assembled and stored in the dry charged state.

The battery cartridge 12 can not perform its designed role as a battery in the dry state. It must be activated by flooding it with a hot, alkaline, aqueous solution referred to as an electrolyte. In an aluminum-silver oxide battery, the electrolyte is typically in the range of 11 to 17% by weight sodium hydroxide (NaOH) in solution at temperatures between 130° F. and 220° F. The higher concentrations and temperatures are frequently used for higher rate discharges of the battery (above 3 amperes per square inch of electrode area in a cell) and lower concentrations and temperatures are frequently used for lower rate discharges of the battery (below 3 amperes per square inch of electrode area in a cell). Additives may also be included in the electrolyte solution for specific purposes. For example, the electrolyte may contain about one percent by weight sodium stannate ($Na_2SnO_3 3H_2O$) as a corrosion inhibitor for the aluminum anode.

In these types of batteries, there is usually a requirement for fast activation of the battery. For a high rate of discharge, fast activation implies the rapid dissolution of the NaOH to a temperature on the order of 200° F.

Referring again to FIG. 1, a typical scenario for battery activation involved initiation by the introduction of water or sea water into the battery system 10 through a flow valve 16. The water or sea water passes through or around a circulating pump 18 and a flow valve 20 to a circulating electrolyte reservoir 22 where a charge of dry NaOH is stored. The water or sea water entering the electrolyte reservoir 22 causes sufficient turbulence to enhance the dissolution of the NaOH in a few seconds, provided the NaOH is in a suitable geometric form, such as small beads or powder. The electrolyte so formed should be of the correct concentration, which is a nominal 15% by weight. The temperature of the electrolyte may rise 80° F. to 100° F. (depending on the final concentration) above the temperature of the incoming water or sea water by virtue of the heat of solution of the NaOH. The resulting temperature may still be too low to operate the battery at high rate, however, a temperature as low as 130° F. would be sufficient to allow low to medium rate discharge of the battery. The electrolyte travels from the circulating electrolyte reservoir 22 through a flow valve 24 (initially configured to by-pass a heat exchanger 26) and via a heat exchanger by-pass 28 to enter and fill the cells of the battery cartridge 12. The inert gas, under which the system 10 was stored, having been forced ahead of the incoming rush of liquid electrolyte, and any hydrogen generated as the battery cartridge 12 was being filled with electrolyte, are both separated from the liquid electrolyte by means of a gas-liquid separator 30 and dispensed overboard into the sea. The degassed electrolyte then exits the gas-liquid separator 30, and after passing through the flow valve 16 (now configured to stop the influx of water or sea water), re-enters the circulating pump 18 which is now operating from battery power from the battery cartridge 12. The re-circulation of the electrolyte around the electrolyte flow path of the battery system 10 and through the cells of the battery cartridge 12 is caused by the impulse pressure of the circulating pump 18 such that the electrolyte in the battery cartridge 12 is changed about 30 times a minute, depending on the rate of discharge. With each complete pass through the battery cartridge 12, the electrolyte temperature rises about 20° F. to the point (above 200° F) where the battery can be discharged efficiently at high rate. Depending upon the volume of the battery system, the temperature of the water or sea water, and the final concentration of the NaOH solution, the time elapsed from the activation of the battery to the time the electrolyte reaches 200° F. can be on the order of 30 or 40 seconds. As the temperature reaches a selected value, some of the hot electrolyte leaving the circulating electrolyte reservoir 22 is diverted through the heat exchanger 26 for cooling with the heat being transferred to the source of the water such as the sea. The selected value depends upon the desired rate at which the battery system will generate energy. Upon leaving the heat exchanger 26, the electrolyte rejoins the electrolyte stream in the by-pass 28 so that the temperature of the electrolyte entering the battery cartridge 12 is correct for the amount of energy being withdrawn from the cartridge 12.

Variations on the above scheme include activating the battery such that a higher concentration of NaOH is formed, perhaps as high as 30 percent by weight. This allows a higher temperature to be reached during battery activation. It also allows for dilution of the electrolyte in order to reduce the concentration of the detrimental contaminant, sodium aluminate ($NaAlO_2$), while maintaining a NaOH concentration above 15% by weight. This scheme requires configuring the flow valve 20 so as to allow a small portion of the electrolyte passing through it to exit the system 10 over board as waste electrolyte. At the same time, the valve 16 must be configured to allow small amounts of water or sea water to enter the electrolyte stream so as to keep the system liquid volume constant.

FIG. 2 illustrates yet another known battery system 10'. In this system, the circulating electrolyte reservoir 22 is kept small to minimize the length of time required to fill the battery cartridge 12 and to minimize the length of time required for the waste heat of the battery to increase the temperature to that required for high rate discharge. In the space saved by making the circulating electrolyte reservoir 22 smaller, an electrolyte replenishment reservoir 34 and a metering pump 36 are installed. The other components of the system 10' are identical to the system of FIG. 1. The electrolyte replenishment reservoir 34, which is isolated from the circulating electrolyte, can be filled with water or sea water while, and after, the battery has been activated as described above. The replenishment reservoir 34 preferably contains sufficient NaOH in a dry state to produce a more concentrated solution, on the order of 60% by weight NaOH, in the reservoir 22 and through the cells of the battery cartridge 12. Higher solution concentrations (greater than 60 percent by weight) are not practical at this point due to the high temperature that are needed for rapid solution of the NaOH at higher concentrations. It should be noted that at higher concentrations, the heat of solution of NaOH decreases. Specifically, at a concentration of 75% by weight, the heat of solution becomes as little as one-fifth of the heat produced at 42% concentration. Also, the concentrated NaOH solution, on the order of 60%, reduces the amount of water or sea water needed on board the underwater vehicle, and hence reduces the overall weight of the underwater vehicle. During the operation of the battery system 10' shown in FIG. 2, when it becomes necessary to discard some waste electrolyte through the flow valve 20, an appropriate amount of concentrated NaOH (60%) solution is introduced into the circulating electrolyte reservoir 22 by means of the metering pump 36. At the same time, some dilution water or sea water is brought into the electrolyte via the flow valve 16.

While the above discussion focuses on aluminum-silver oxide batteries, the same scenario applies to aluminum-hydrogen peroxide batteries and similar alkaline, aqueous batteries. The only change that is typically made is to the concentration and the temperature of NaOH that is stored in the reservoir 22 and thereby circulates throughout the battery system.

While the above mentioned systems are workable, there are some drawbacks which limit mission capability. These drawbacks include (a) the length of time to fill the circulating electrolyte reservoir, (b) having to wait for the waste battery heat to raise the electrolyte temperature to the point that will allow the battery to be discharged at a high rate, and (c) the weight and volume penalty of having a circulating electrolyte reservoir 22 or replenishment electrolyte reservoir 34 of sufficient size to supply all the NaOH, at the correct temperature and concentration, required for the entire mission. The present invention minimizes these drawbacks.

SUMMARY OF THE INVENTION

Accordingly, it is an object of the present invention to provide an improved composition for forming sodium hydroxide electrolyte solutions to be used in battery systems.

It is a further object of the present invention to provide an improved composition as above which yield electrolyte solutions that generate a greater degree of heat for quickly activating said battery systems.

It is yet a further object of the present invention to provide an improved composition as above which allows the storage of an electrolyte solution for said battery systems in a highly concentrated, pumpable liquid form.

Still further, it is an object of the present invention to provide an improved battery system and method for generating electrical power which employ the compositions of the present invention.

The foregoing objects are attained by the dry compositions, battery system and method for generating electrical power of the present invention.

In accordance with the present invention, the dry compositions for use with a wide variety of battery systems comprise dry mixtures of sodium hydroxide and sodium oxide. For initiating the operation of the battery system, a first mixture of sodium hydroxide and sodium oxide is present in a dry state in a first reservoir in an amount sufficient to form with water a heated sodium hydroxide electrolyte solution having a 15% by weight concentration of sodium hydroxide. For continuing the operation of the battery system, a second mixture of sodium hydroxide and sodium oxide is present in a dry state in a second reservoir in an amount sufficient to form with water a heated sodium hydroxide electrolyte solution having to up to about 75% by weight concentration of sodium hydroxide.

Still further, in accordance with the present invention, a battery system and a method for generating electrical power are provided. The battery system broadly comprises a battery cartridge for generating electrical power, a first reservoir containing a mixture of sodium hydroxide and sodium oxide in a dry state; means for adding water to the mixture in the first reservoir to form a first electrolyte solution containing approximately 15% by weight sodium hydroxide and 85% by weight water; and means for circulating the first electrolyte solution to the battery cartridge to initiate operation of the battery system. The battery system further comprises a second reservoir for storing a mixture of sodium hydroxide and sodium oxide in a dry state; and means for introducing water into the second reservoir so as to form a second electrolyte solution containing up to about 75% by weight sodium hydroxide and at least about 25% by weight water.

The method for generating electric power broadly comprises the steps of formulating a first heated sodium hydroxide electrolyte aqueous solution having a sodium hydroxide concentration of approximately 15% by weight, circulating the first electrolyte solution through a cartridge of battery cells for initiating generation of electrical power, formulating a second heated sodium hydroxide solution having a concentration of sodium hydroxide of about 75% by weight and progressively introducing same into the flow of electrolyte solution circulated through the battery cell cartridge.

Other details of the dry compositions, battery system and method for generating electrical power of the present invention, as well as other objects and advantages attendant thereto are set forth in the following detailed description and the accompanying drawings wherein like reference numerals depict like elements.

DETAILED DESCRIPTION OF THE PREFERRED EMBODIMENT(S)

As discussed above the present invention relates to an improved composition for making an electrolyte solution to be used in a battery system on board underwater and other types of vehicles. The improved composition of the present invention will be discussed in the context of using same in the battery system 10' of FIG. 2; however, the composition could be used in other types of battery systems.

Figure 1:
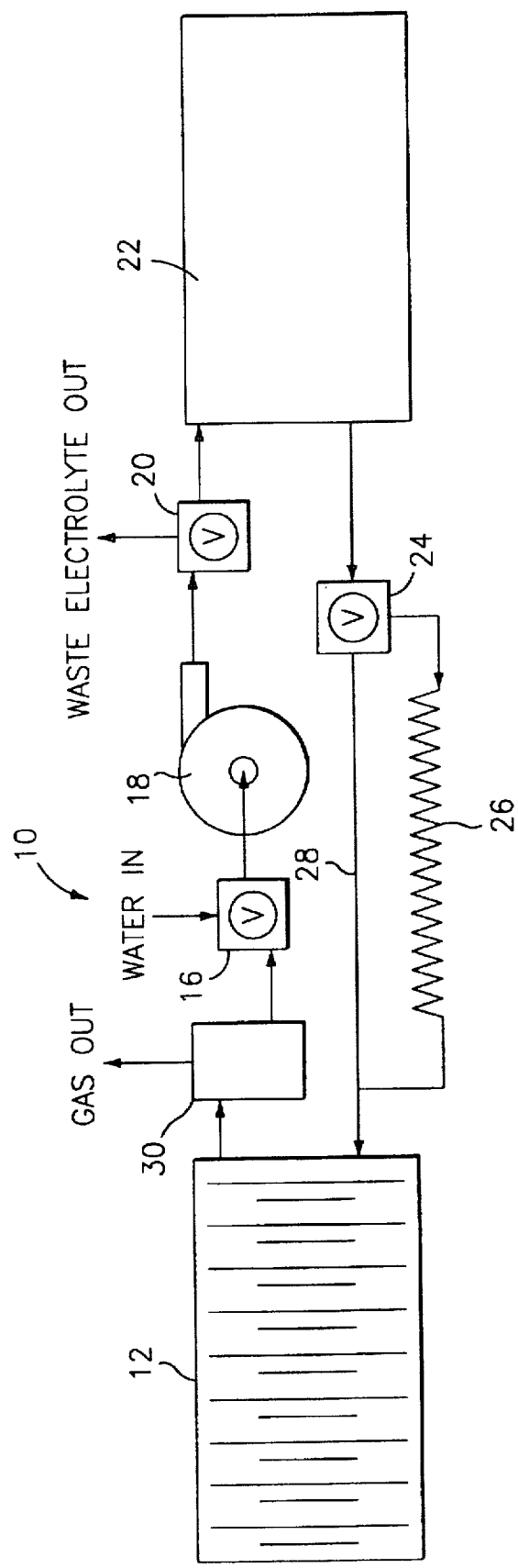
FIG. 1 illustrates a prior art battery system using a NaOH electrolyte solution.
Figure 2:
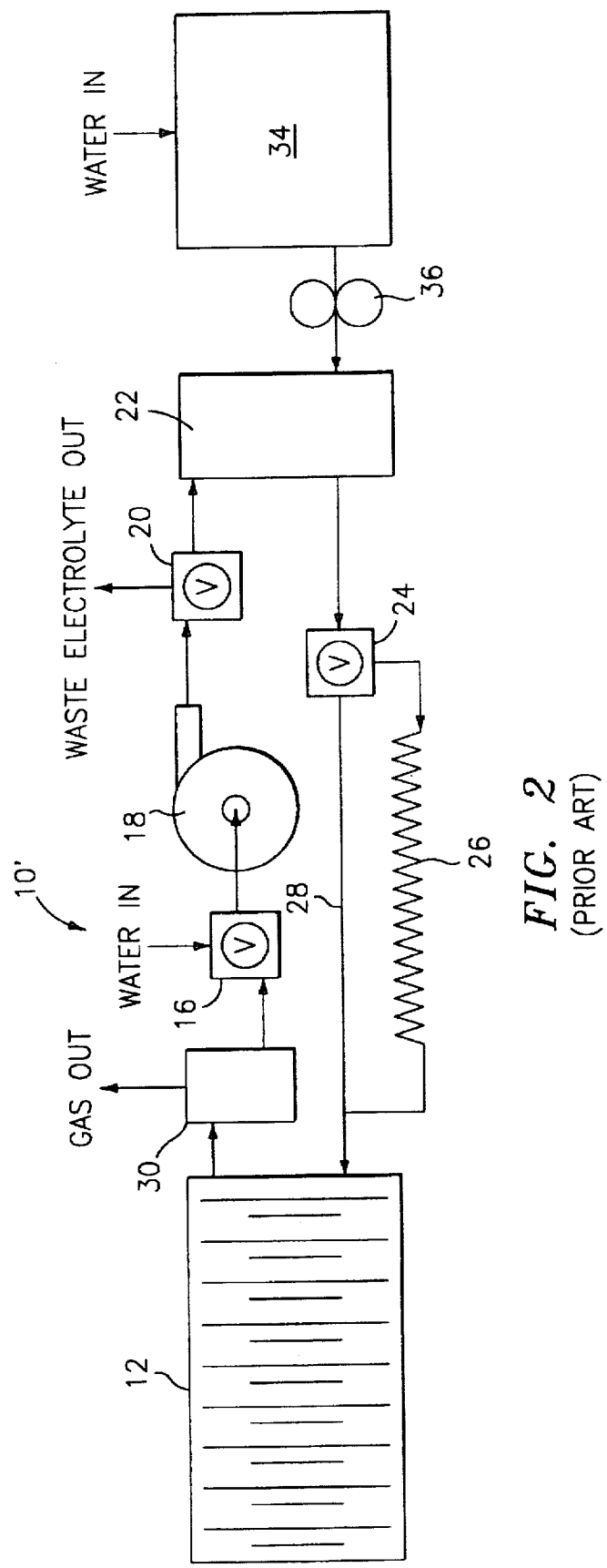
FIG. 2 illustrates a second prior art battery system using a NaOH electrolyte solution.

In accordance with the present invention, both the circulating electrolyte reservoir 22 and the electrolyte replenishment reservoir 34 shown in the system of FIG. 2 contain a dry composition consisting of a mixture of sodium oxide, $Na_2O$, and sodium hydroxide, NaOH. Preferably, the dry composition is stored in each reservoir under an inert gas cover. The actual amount of dry mixture present in each reservoir is dependent upon the battery size and the quantity of liquid electrolyte to be generated. Preferably, the circulating electrolyte reservoir 22 contains a sufficient quantity of sodium hydroxide and sodium oxide so that after water has been added, a first electrolyte solution having about 15% by weight sodium hydroxide and about 85% by weight water is formed. The electrolyte replenishment reservoir 34 contains a sufficient quantity of sodium hydroxide and sodium oxide so that after water has been added, a second electrolyte solution having up to approximately 75% by weight sodium hydroxide and at least about 25% by weight water is formed.

It has been found that use of the new mixture(s) of sodium oxide and sodium hydroxide increase the rate of producing a NaOH electrolyte solution without otherwise changing the end composition, unless it is otherwise desired to increase the amount of the sodium hydroxide concentration. It also has been found that use of the new mixtures of the present invention improves the operation of battery systems such as that shown in FIG. 2.

The improvements in the battery systems are based in part on the following properties of sodium oxide and sodium hydroxide when used as a dry electrolyte mixture within the circulating reservoir 22:

Heat of reaction:

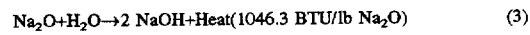

$$Na_2O + H_2O \rightarrow 2\ NaOH + Heat(1046.3\ BTU/lb\ Na_2O) \quad (3)$$

Heat of solution:

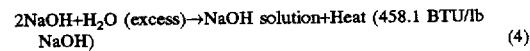

$$2NaOH + H_2O\ (excess) \rightarrow NaOH\ solution + Heat\ (458.1\ BTU/lb\ NaOH) \quad (4)$$

Thus, for each pound of NaOH dissolved at low concentrations, such as 15% by weight, about 458 BTU's of heat are released, but for every pound of $Na_2O$ dissolved in the solution, 1637.4 BTU's of heat are released.

The following example demonstrates the value of the use of the sodium oxide and sodium hydroxide mixture in the circulating electrolyte reservoir 22. If the dry chemical stored therein is 100 percent sodium hydroxide and the final solution after activation by water has a concentration of 15 percent by weight of sodium hydroxide, the maximum theoretical temperature rise will be 76.6° F. In comparison, however, if in the circulating electrolyte reservoir 22, the dry chemicals stored therein contain 9 parts of sodium oxide for every 10 parts of sodium hydroxide and the final solution after activation with water has a concentration of 15% by weight sodium hydroxide, the maximum theoretical temperature rise will be 149.4° F. If the water used to activate the dry chemical mixture in the reservoir 22 is at a temperature of 50° F., the example using a dry mixture of 100% sodium hydroxide would have a final solution temperature of 126.6° F. whereas the example using the sodium oxide and sodium hydroxide mixture would have a final solution temperature of 199.4° F. At the lower temperature, 126.6° F. the battery is incapable of delivering a high rate discharge, whereas at the higher temperature, 199.4° F., the battery is quite capable of delivering a high rate discharge.

Figure 3:
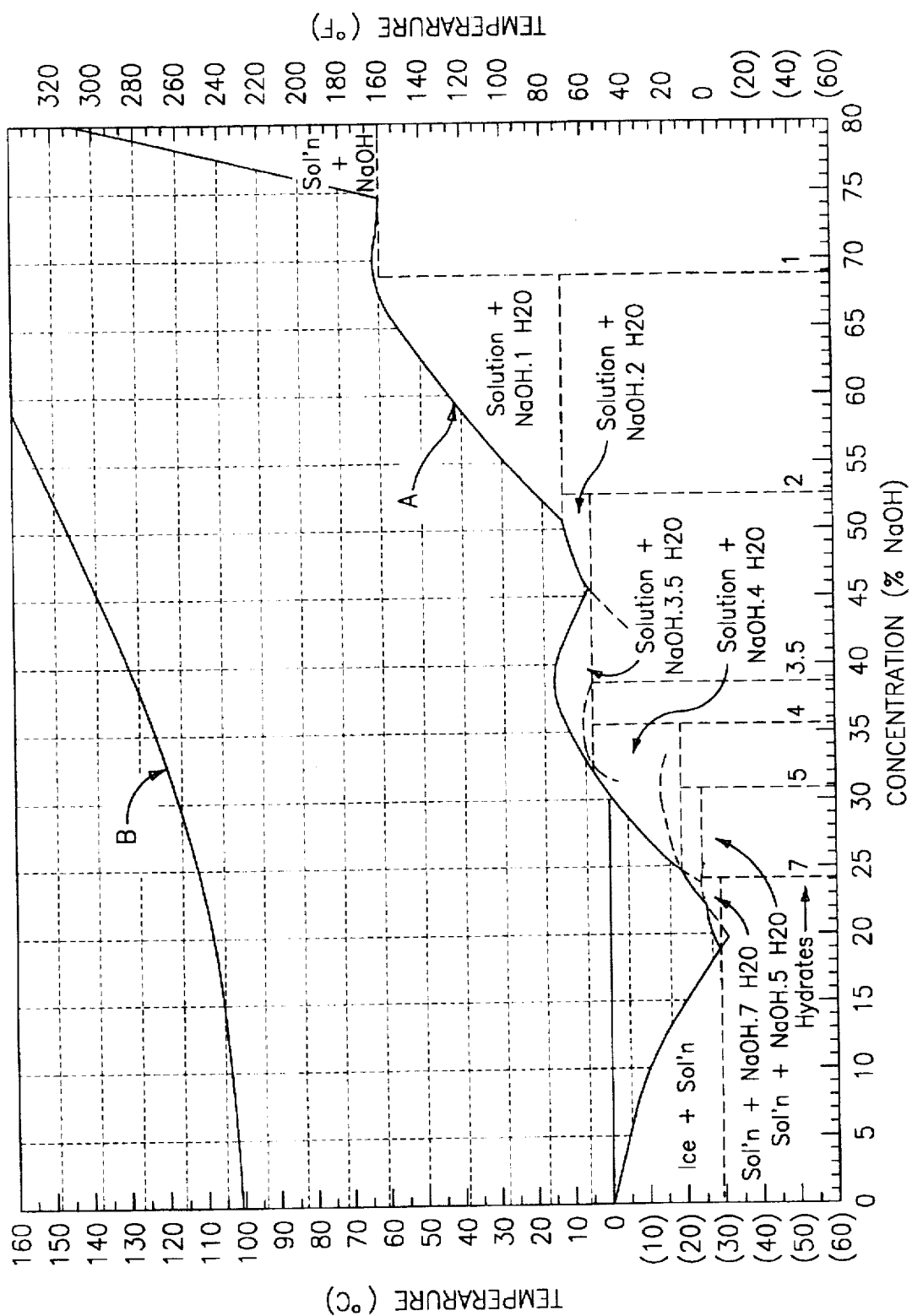
FIG. 3 is a graph illustrating the phase equilibrium of sodium hydroxide in water.

It is therefore possible using the mixture of the present invention to prepare sodium hydroxide solutions at the desired concentration at any temperature desired up to the boiling point of the solution at one standard atmosphere and pressure, and even higher if boiling is subdued by increased pressure. FIG. 3 illustrates at which temperature a particular concentration of sodium hydroxide will begin to freeze (Curve A) and at which temperature a particular concentration of sodium hydroxide will begin to boil (Curve B).

Mixtures in accordance with the present invention also enable more highly concentration solutions of sodium hydroxide to be prepared without providing external heat. Referring again to the battery system of FIG. 2, it is desirable in the interest of saving space and weight to produce the highest possible concentration of sodium hydroxide solution in the electrolyte replenishment reservoir 34. The electrolyte replenishment reservoir 34 preferably contains a mixture of sodium oxide and sodium hydroxide which exhibits the following properties when activated with water to produce a 75% by weight sodium hydroxide solution:

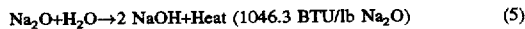

$$Na_2O + H_2O \rightarrow 2\ NaOH + Heat\ (1046.3\ BTU/lb\ Na_2O) \quad (5)$$

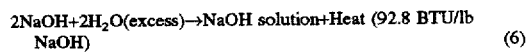

$$2NaOH + 2H_2O(excess) \rightarrow NaOH\ solution + Heat\ (92.8\ BTU/lb\ NaOH) \quad (6)$$

The maximum temperature rise when dissolving sodium hydroxide to a 60% by weight concentration is about 160° F. In such a solution, freezing starts at about 120° F. and is completed at about 54° F. The maximum temperature rise when dissolving sodium hydroxide to a concentration of 75% by weight is only about 110° F. In such a solution freezing starts at about 160° F. and is completed at about 144° F. From these specifics, it is apparent when starting with cool materials below 50° F., that dissolving sodium hydroxide in water to produce a 75% solution is impossible without an external heat source.

Using a dry mixture in accordance with the present invention in reservoir 34 solves this problem. Again, the maximum temperature rise when dissolving sodium hydroxide alone to a 75% by weight concentration is about 110° F. It has been found that when using a dry mixture of 5 parts sodium oxide per 100 parts of sodium hydroxide to make a 75% by weight solution of sodium hydroxide, the theoretical temperature rise is about 195° F. If, because of anticipated heat losses due to conductive and convective cooling, even more heat is required, the use of 10 parts of sodium oxide per 100 parts of sodium hydroxide to make a 75% solution of sodium hydroxide produces a theoretical temperature rise of 269° F. Even at 75% concentration, solutions of sodium hydroxide at these temperatures are very mobile liquids and easily pumpable.

The importance of being able to generate and store a replenishing electrolyte in the reservoir 34 at 75% concentration instead of 60% concentration can be demonstrated as follows. For each cubic foot of reservoir volume, approximately 33% more sodium hydroxide is carried in solution at 75% concentration than at 60% concentration. Another way of considering the importance of this is that in one cubic foot at 75% concentration, about 80 pounds of sodium hydroxide are contained in a solution weighing about 107 pounds. A solution containing 80 pounds of sodium hydroxide at 60% concentration would weigh over 133 pounds and occupy 1.33 cubic feet.

In operation, the sodium hydroxide and sodium oxide mixtures are stored in a dry state in reservoirs 22 and 34. Preferably, they are stored under a cover of an inert gas such as argon. When it is necessary to activate the battery system 10', cool water, such as cool sea water, is admitted to the system via valve 16. The cool water flows through the pump 18 and the valve 20 into the reservoir 22. The cool water is present in a quantity sufficient to form an electrolyte solution having a sodium hydroxide concentration of 15% by weight. As discussed above when the dry sodium hydroxide and sodium oxide mixture in the reservoir 22 is reacted with water, heat is generated. Thus, a heated first electrolyte solution is formed. The first electrolyte solution thus formed is then allowed to flow into the cells of the battery cartridge 12 via flow valve 24 and by-pass 28 to activate the battery system and commence the generation of electrical power. The electrolyte solution is allowed to flow through the battery system as previously discussed. At the same time that water is admitted to the reservoir 22, it is also admitted to the reservoir 34. The water which is admitted is in a quantity sufficient to preferably form a second electrolyte solution having a concentration of approximately 75% by weight sodium hydroxide. As before, the reaction between the water and the sodium hydroxide and sodium oxide mixture in the reservoir 34 generates heat. Thus, a heated second sodium hydroxide electrolyte solution is formed and stored in the reservoir 34. When needed, the second electrolyte solution in the reservoir 34 is released via valve 20 and caused to flow in a metered amount to the reservoir 22 via metering pump 36. Heat exchanger 26 may cool the flowing electrolyte for optimum battery operation.

It has been found that by using mixtures of sodium oxide and sodium hydroxide in accordance with the present invention instead of sodium hydroxide alone, the following improvements in an aluminum-silver oxide system are obtained: (a) faster activation time; (b) more than 30 seconds faster time to high rate discharge capability (80 to 90% faster); and (c) lower weight of stored sodium hydroxide solution in the circulating electrolyte and electrolyte replenishment reservoirs.

While the present invention has been discussed in the context of an aluminum-silver oxide battery system, it should be recognized that the mixtures of the present invention could be used in an aluminum-hydrogen peroxide battery and other similar alkaline, aqueous batteries. The size of the reservoir tanks, as well as the amount of dry sodium oxide, sodium hydroxide and water used to effectuate a chemical reaction, is dependent upon the size and type of battery system.

It is apparent that there has been provided in accordance with this invention improved compositions for use in battery systems which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An improved battery system comprising:

a battery cartridge for generating electrical power;

a first reservoir containing a mixture of sodium hydroxide and sodium oxide in a dry state;

means for adding water to said mixture in said first reservoir to form a first electrolyte solution containing approximately 15% by weight sodium hydroxide and 85% by weight water; and means for circulating said first electrolyte solution to said battery cartridge to initiate operation of said battery system.

2. The battery system of claim 1 further comprising:

a second reservoir for storing a mixture of sodium hydroxide and sodium oxide in a dry state; and means for introducing water into said second reservoir so as to form a second electrolyte solution containing up to about 75% by weight sodium hydroxide and at least about 25% by weight water.

3. The battery system of claim 2 further comprising means to feed a measured amount of said second electrolyte solution to said first reservoir.

4. The battery system of claim 3 further comprising:

means for removing waste electrolyte from said battery system.

5. The battery system of claim 2 further comprising:

said first and second reservoirs each being provided with an inert gas atmosphere while said sodium hydroxide and sodium oxide mixtures are stored in said dry state; and means for separating said inert gas from said electrolyte solutions and for removing said separated inert gas from said battery system.

6. The battery system of claim 2 further comprising:

means for cooling said electrolyte solution operatively associated with said battery cartridge; and means for by-passing said cooling means.

7. An improved method for operating a battery system comprising the steps of:

storing a mixture of sodium hydroxide and sodium oxide in a dry state in a first reservoir;

introducing water into said first reservoir in an amount sufficient to form a first heated sodium hydroxide electrolyte solution having a sodium hydroxide concentration of approximately 15% by weight; and feeding said first heated sodium hydroxide electrolyte solution to a battery cartridge for initiating the generation of electrical power.

8. The method of claim 7 wherein said storing step comprises storing a mixture having 9 parts sodium oxide for every 10 parts of sodium hydroxide in said first reservoir.

9. The method of claim 7 further comprising:

storing a second mixture of sodium hydroxide and sodium oxide in a dry state in a second reservoir; and introducing an amount of water into said second reservoir sufficient to form a second heated sodium hydroxide electrolyte solution having a concentration of sodium hydroxide of up to about 75% by weight.

10. The method of claim 9 wherein said second mixture storing step comprises storing from about 5 parts to about 10 parts sodium oxide per 100 parts of sodium hydroxide in said second reservoir.

11. The method of claim 9 further comprising:

supplying said second solution to said first reservoir so as to replenish a depleted portion of said first electrolyte solution.

12. A method for generating electric power comprising the steps:

formulating a first heated sodium hydroxide electrolyte aqueous solution having a sodium hydroxide concentration of approximately 15% by weight;

circulating said first electrolyte solution through a cartridge of battery cells for initiating generation of electrical power; and formulating a second heated sodium hydroxide solution having a concentration of sodium hydroxide of about 75% by weight and progressively introducing same into the flow of electrolyte solution circulated through the battery cells cartridge.

13. The method of claim 12 wherein both said first and second electrolyte solutions are formulated by mixing an aqueous liquid agent with a dry state mixture of sodium hydroxide and sodium oxide.

14. The method of claim 13 wherein the dry state mixture of sodium hydroxide and sodium oxide employed in formulating said first electrolyte is about 9 parts of sodium oxide for every 10 parts of sodium hydroxide, and the dry state mixture employed in formulating said second electrolyte is about 10 parts of sodium oxide for every 100 parts of sodium hydroxide.

15. The method of claim 12 wherein:

said second electrolyte solution is introduced into the flow of electrolyte solution circulates through the battery cells cartridge at a predetermined flow rate; and a corresponding flow rate of waste electrolyte is removed from the electrolyte flow circulating through the battery cells cartridge.

16. The method of claim 12 wherein after initiation of introduction of the second electrolyte solution into the electrolyte flow circulating through the battery cells cartridge such flow is cooled to provide electrical power discharge characteristics from said cartridge.

17. The method of claim 13 wherein said battery cells cartridge is of special utility as a power source carried by an underwater vehicle and said aqueous liquid agent is saline seawater.

18. The method of claim 12 wherein said path of circulation of electrolyte through the battery cells cartridge includes an electrolyte replenishment chamber, said second electrolyte solution being introduced into said path via the replenishment chamber.

* * * * *